Oct. 23, 1962

K. KRÖMER ET AL 3,059,555

PHOTOGRAPHIC CAMERA

Filed June 20, 1960

Inventors
KARL KRÖMER
EDITH BERGER
By Irwin S. Thompson
Attorney

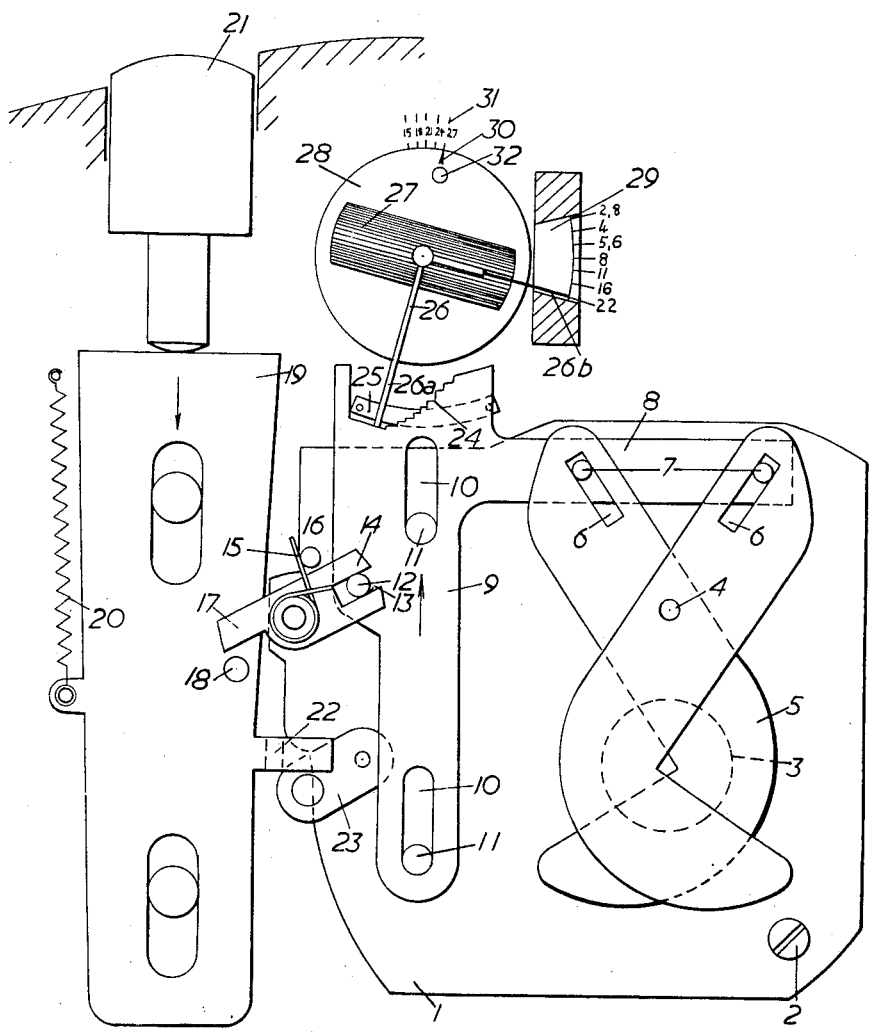

United States Patent Office 3,059,555
Patented Oct. 23, 1962

3,059,555
PHOTOGRAPHIC CAMERA
Karl Krömer, Radebeul, and Edith Berger, Dresden, Germany, assignors to VEB Kamera- und Kinowerke Dresden, Dresden, Germany
Filed June 20, 1960, Ser. No. 37,121
1 Claim. (Cl. 95—10)

The present invention relates to a photographic camera with fully automatic control of an exposure factor, preferably of the diaphragm, wherein a spring-driven exposure-factor setting member explores the position of a meter pointer.

Known devices of this nature are of such kind that the setting member pressed under spring action against the meter pointer is tensioned together with the conveying of the film or the cocking of the shutter mechanism. However, such devices are unsuitable in the case of the use of automatic shutters, because then special gear connections would be necessary between the setting member and the conveying means of the film. Setting handles are also already known which actuate the release and entrain the setting member, through a spring, in the release. However, the long actuation path occurring for these setting handles disadvantageously impairs the constructional design of the release or actuation device for shutter and setting member.

It is the task of the present invention to avoid the above disadvantages through a gear arrangement which renders possible a common release for shutter and setting member.

In accordance with the invention this is achieved due to the fact that the camera release, on depression, releases the cocked setting member and both for the camera release and also for the setting member a common return spring is provided which overcomes the said drive spring. The gear connection between the camera release and the setting member is expediently effected by a two-armed transmission lever equipped with the drive spring for the setting member. The preferably rectilinearly guided setting member possesses an arm, the pins of which engage in slots of diaphragm blades swinging in opposite directions about a common pivot pin and possesses a machined-in curve with which it explores the meter pointer. The details of the invention may be seen from a described and illustrated example of embodiment.

FIGURE 2 shows the control device during the taking of a picture.

Figure 1:
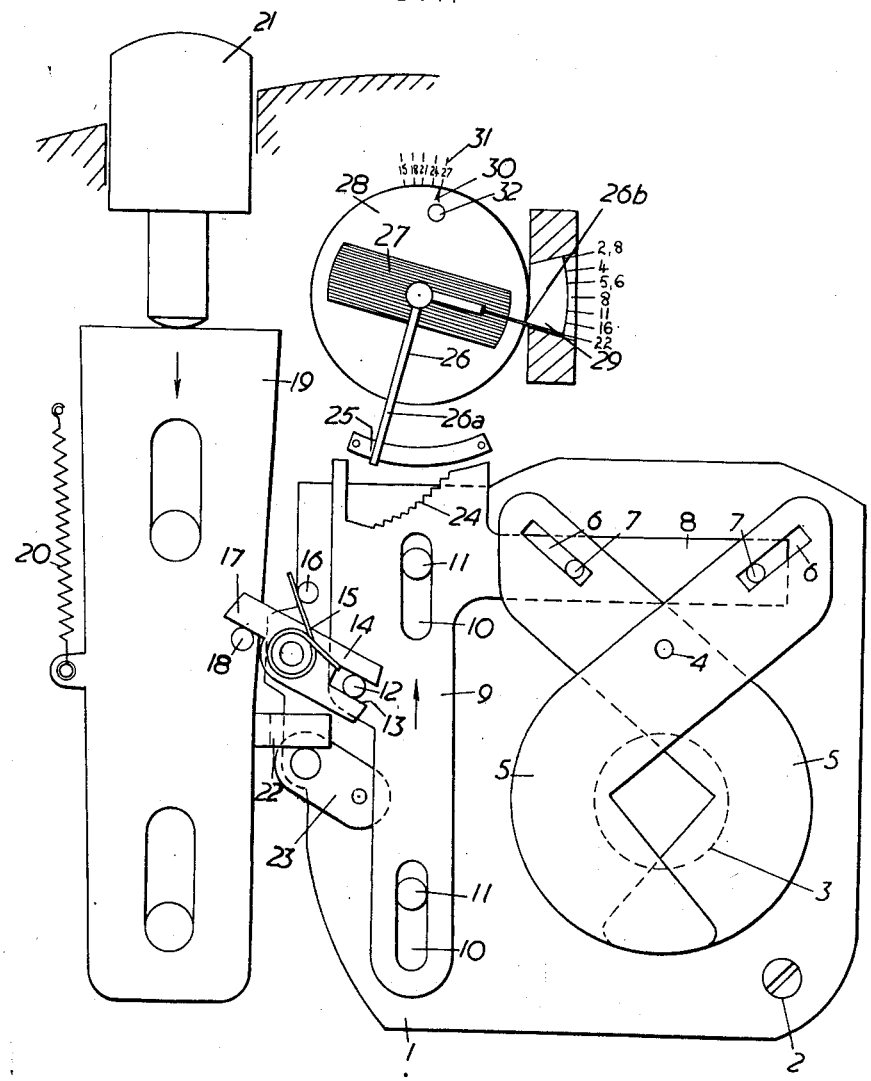
FIGURE 1 shows the control device in the cocked position.

In a camera housing (not shown here) the shutter base plate 1 is secured by means of screws 2. Over the light passage aperture 3 there lie the diaphragm blades 5 rotatable about the pivot pin 4, in the slots 6 of which blades there engage pins 7. The said pins 7 are secured on the arm 8 of the setting member 9, which is guided by means of slots 10 in pins 11 mounted on the base plate 1. The pin 12 of the setting member 9 lies in a fork 13 of the transmission lever 14, which is supported through the spring 15 on the pin 16 fast with the housing. Through the arm 17 the transmission lever 14 is connected with the pin 18 of the camera release 19, on which there is secured the return spring 20. The return spring 20 is made stronger than the drive spring 15.

For the displacement of the camera release 19 there serves the release knob 21. The lug 22 bent off from the camera release 19 is in engagement with the shutter release 23.

In the setting member 9 there is machined the stepped cam 24. The end 26a of the pointer 26, which is connected with the moving coil 27 of a meter 28, swings along a support rail 25, in relation to this cam. The other end 26b is visible in a window 29 provided with diaphragm values. The entire meter 28 is rotatably mounted and possesses a mark 30, opposite which there is arranged a scale 31 with values for film sensitivities.

The manner of operation of the device is as follows:

Firstly, the introduced kind of film is set by rotation of the meter 28 by means of the scale 31 with values for film sensitivities and the mark 30. If then on aiming at an object of which a picture is to be taken, the end 26b of the meter pointer 26 is visible in the free area of the window 29 provided with a diaphragm scale, the taking of a picture can be carried out. If the pointer end 26b is not visible, the diaphragm range available is not sufficient for the carrying out of a properly exposed picture-taking.

For the purpose of release of the shutter the release knob 21 is depressed. Consequently, the camera release 19 is shifted against the action of the return spring 20. Then the pin 18 departs from the arm 17 of the transmission lever 14, so that the drive spring 15 can rotate the said transmission lever 14 in the counterclockwise direction. The setting member 9 is pressed with its stepped cam 24 against the end 26a of the meter pointer 26 resting upon the support rail 25, by the fork 13 of the transmission lever 14, through the pin 12. According to the position of the pointer 26 the setting member 9 is displaced more or less far so that through the pins 7 arranged on the arm 8 the diaphragm blades 5 cover the light passage aperture 3 more or less. Finally, the lug 22 rotates the shutter release 23, whereby the exposure operation is instigated.

Obviously the rotation of the meter 28 can also be utilised for taking different exposure times into consideration. The pin 32 is then expediently coupled with an exposure time setting member (not shown separately). The film sensitivities are then preferably taken into consideration by relative displacement in relation to the exposure time setting member.

We claim:

In a photographic camera having a housing, a shutter device mounted on the housing, a shutter operating mechanism, and a photoelectric moving coil exposure meter, the provision of a base plate mounted in the housing and having a light aperture therein, two oppositely movable diaphragm blades pivotally mounted on the base plate, to vary the effective area of the aperture, a pointer connected to the moving coil, exposure factor setting means operatively connected to the diaphragm blades and substantially rectilinearly movable towards the pointer, the setting means being provided with a stepped cam to abut against the pointer when the setting member is moved towards the pointer, the setting member position when abutting against the pointer depending upon the position of the pointer, a drive spring connected between the base plate and the setting means for urging the latter towards the pointer, a camera release member operably connected to the shutter operating mechanism and substantially rectilinearly movable parallel to the setting means, a return spring connected to the camera release member to oppose operation of the release member, and hence of the shutter, a transmission member pivotally mounted on the base plate and coupled to the camera release member and to the setting means in such a manner that the return spring is able to overcome the drive spring and to urge the setting means away from the pointer when the camera release member is unoperated, while allowing the setting member to move towards the pointer, under the action of the drive spring, upon operation of the camera release member.

References Cited in the file of this patent

UNITED STATES PATENTS

| | | |
|---|---|---|
| 2,058,531 | Tuttle | Oct. 27, 1936 |
| 2,061,909 | Karg | Nov. 24, 1936 |
| 2,250,898 | Tonnies | July 29, 1941 |
| 2,421,499 | Guedon | June 3, 1947 |